UNITED STATES PATENT OFFICE.

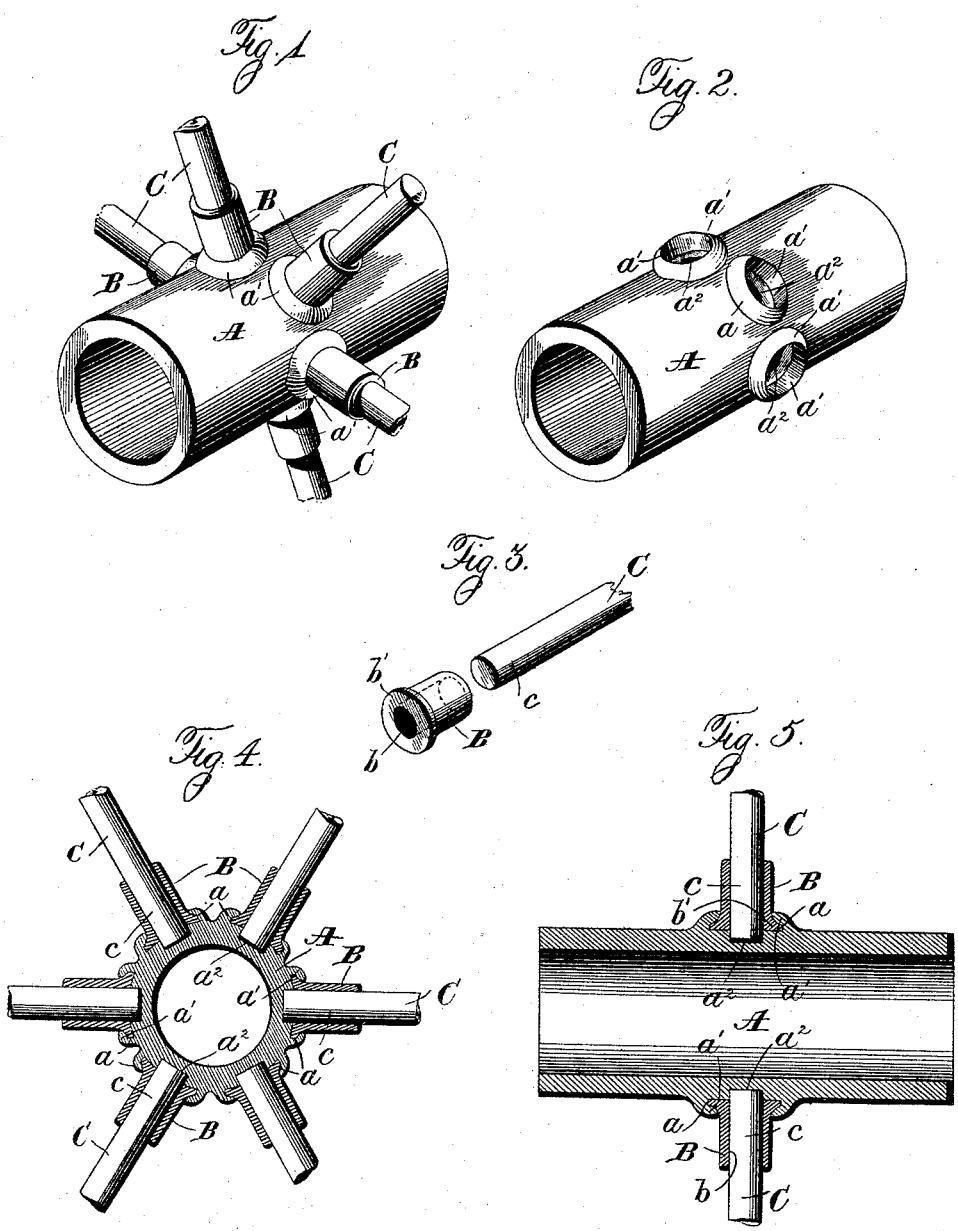

JAMES R. LITTLE, OF QUINCY, ILLINOIS.

METAL WHEEL.

SPECIFICATION forming part of Letters Patent No. 487,281, dated December 6, 1892.

Application filed February 24, 1892. Serial No. 422,701. (No model.)

*To all whom it may concern:*

Be it known that I, JAMES R. LITTLE, of Quincy, in the county of Adams, and in the State of Illinois, have invented certain new and useful Improvements in Metal Wheels; and I do hereby declare that the following is a full, clear, and exact description thereof, reference being had to the accompanying drawings, in which—

Figure 1 is a perspective view of the hub portion of a metal wheel constructed in accordance with my improved method. Fig. 2 is a like view of the hub before the spokes are secured in place. Fig. 3 is a perspective view of the tenon end of a spoke and of the thimble used for combining the same with the hub, and Figs. 4 and 5 are respectively sections of the hub upon a line passing circumferentially through the line of spokes and thimbles and upon a line passing lengthwise through said hub.

Letters of like name and kind refer to like parts in each of the figures.

My invention relates to wheels in which the entire wheel is constructed from metal; and it consists in a wheel having its hub and spokes united substantially as and for the purpose hereinafter specified.

In the carrying of my invention into practice I employ a hub A, which is preferably constructed from malleable iron; but, if desired, may be constructed from steel or other similar metal that is capable of having its form changed by pressure or percussion. Said hub is provided at equidistant points around its periphery with recesses or sockets $a$ and $a$, which are preferably round in plan view, but may have any other form desired, and are each formed by means of an inclosing curb $a'$, that has its inner face vertical to the periphery of said hub. Within each socket $a$ is loosely fitted a thimble B, which is made of malleable iron or steel and interiorly $b$ is adapted to receive and contain the inner end or tenon $c$ of a spoke C and at its lower end $b'$ has an outward flare, as shown.

In combining the parts of the wheel a thimble B is secured by compression upon the tenon $c$ of a spoke C, and said parts then placed in position within a socket $a$ and the curb $a'$ pressed inward by suitable machinery until it closely embraces the enlarged lower end $b'$ of said thimble and confines the same and said spoke in place.

Each of the sockets $a$ of the hub A is preferably provided with a central recess $a^2$, into which is placed the end of the spoke-tenon $c$; but such recess may be omitted, if desired. The circular sockets may also be omitted, and in their place an annular groove may be formed around the hub and the walls or curbs of such groove pressed inward and caused to engage with the thimbles to confine the same in place; but in such event the recesses for the spoke-tenons would be necessary or the thimbles would require such construction as to cause them to fill said groove in order to prevent the movement of the spokes around the hub. If desired, the thimbles may be omitted and the inner end of each spoke enlarged, so as to furnish a lock when the curb is turned inward.

While the parts described are preferably united when cold, the thimbles and hub, or either of the same, may, if desired, be heated before compression, so as to add to the strength of the bond the element of the contraction of the inclosing metal.

Having thus described my invention, what I claim is—

1. A metal wheel in which the spokes are provided at their inner ends with enlargements that are securely clamped between oppositely-arranged curbs or lips, which are pressed inward and caused to embrace such enlargements, substantially as and for the purpose specified.

2. A metal wheel in which each spoke has secured upon its inner end a thimble with an enlarged inner end and such enlarged end is securely clamped between oppositely-arranged curbs or lips which are provided upon the periphery of the hub and are bent inward and caused to embrace such enlargement, substantially as and for the purpose shown.

3. A metal wheel in which is combined a hub that is provided with equidistant recesses around its periphery and curbs or lips upon opposite sides of each recess, spokes which have their inner ends placed within such recesses, and thimbles that are secured upon said spokes and have their inner enlarged ends contained between said curbs or lips and
5 are securely clamped in place by the bending inward of the same, substantially as and for the purpose set forth.

In testimony that I claim the foregoing I have hereunto set my hand this 28th day of January, 1892.

JAMES R. LITTLE.

Witnesses:
    S. DEIDESHEIMER,
    S. M. WALLACE.